United States Patent
Turner et al.

(10) Patent No.: US 12,271,992 B2
(45) Date of Patent: Apr. 8, 2025

(54) HYBRID DEPTH MAPS

(71) Applicant: GOOGLE LLC, Mountain View, CA (US)

(72) Inventors: Eric Turner, Somerville, MA (US); Adarsh Prakash Murthy Kowdle, San Francisco, CA (US); Bicheng Luo, Sunnyvale, CA (US); Juan David Hincapie Ramos, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 198 days.

(21) Appl. No.: 18/001,659

(22) PCT Filed: Sep. 1, 2021

(86) PCT No.: PCT/US2021/071339
§ 371 (c)(1),
(2) Date: Dec. 13, 2022

(87) PCT Pub. No.: WO2023/033858
PCT Pub. Date: Mar. 9, 2023

(65) Prior Publication Data
US 2023/0274491 A1    Aug. 31, 2023

(51) Int. Cl.
*G06T 15/00* (2011.01)
*G06T 7/50* (2017.01)
*G06T 15/04* (2011.01)

(52) U.S. Cl.
CPC ............ *G06T 15/04* (2013.01); *G06T 7/50* (2017.01)

(58) Field of Classification Search
None
See application file for complete search history.

(56) References Cited

U.S. PATENT DOCUMENTS

| 8,248,410 B2 | 8/2012 | Tan |
| 11,580,705 B2 | 2/2023 | Steinbrücker et al. |
| 2016/0182893 A1* | 6/2016 | Wan .......... G06T 7/593 348/50 |
| 2016/0239978 A1* | 8/2016 | Cole .......... G06T 7/557 |

(Continued)

FOREIGN PATENT DOCUMENTS

| JP | H07181024 A | 7/1995 |
| JP | 2003329448 A | 11/2003 |

(Continued)

OTHER PUBLICATIONS

International Search Report and Written Opinion for PCT Application No. PCT/US2021/071339, mailed on Jul. 21, 2022, 19 pages.

*Primary Examiner* — Martin Mushambo
(74) *Attorney, Agent, or Firm* — Brake Hughes Bellermann LLP (57) ABSTRACT

A method including receiving (S605) a request for a depth map, generating (S625) a hybrid depth map based on a device depth map (110) and downloaded depth information (105), and responding (S630) to the request for the depth map with the hybrid depth map (415). The device depth map (110) can be depth data captured on a user device (515) using sensors and/or software. The downloaded depth information (105) can be associated with depth data, map data, image data, and/or the like stored on a remote (to the user device) server (505).

24 Claims, 7 Drawing Sheets

(56) References Cited

U.S. PATENT DOCUMENTS

| | | | |
|---|---|---|---|
| 2016/0253839 A1* | 9/2016 | Cole | ............... G09G 5/006 |
| | | | 345/420 |
| 2018/0131924 A1 | 5/2018 | Jung et al. | |
| 2021/0125414 A1 | 4/2021 | Berkebile | |

FOREIGN PATENT DOCUMENTS

| | | |
|---|---|---|
| JP | 2010140476 A | 6/2010 |
| JP | 2013205867 A | 10/2013 |
| JP | 2021507403 A | 2/2021 |

* cited by examiner

FIG. 7

HYBRID DEPTH MAPS

CROSS REFERENCE TO RELATED APPLICATION

This application is a 35 U.S.C. § 371 National Phase Entry Application from PCT/US2021/071339, filed Sep. 1, 2021 designating the U.S., the disclosure of which is incorporated herein by reference in their entirety.

FIELD

Embodiments relate to generating depth images, depth maps, and/or the like for use by applications executing on a mobile device operating in an open air or outdoor environment, and/or an indoor environment.

BACKGROUND

Augmented Reality libraries can use depth images, depth maps, and/or the like to enhance the realism and immersion of applications for features including, for example, occlusion, physics, object placement, relighting, and atmospheric rendering effects.

SUMMARY

In a general aspect, a device, a system, a non-transitory computer-readable medium (having stored thereon computer executable program code which can be executed on a computer system), and/or a method can perform a process with the method including receiving a request for a depth map, generating a hybrid depth map based on a device depth map and downloaded depth information, and responding to the request for the depth map with the hybrid depth map.

Implementations can include one or more of the following features. For example, generating the hybrid depth map can include retrieving the downloaded depth information from a network device, and transforming a format of the downloaded depth information to match a format of the device depth map. The generating of the hybrid depth map can include rendering the device depth map as geometric data, rendering the downloaded depth information as geometric data, and blending the device depth map geometric data with the downloaded depth information geometric data. The geometric data can be a surface element (surfel). The downloaded depth information is in a latitude/longitude coordinate system format, the device depth map is in a cartesian coordinate system format and generating the hybrid depth map includes transforming the downloaded depth information format to the cartesian coordinate system format. The method can further include triggering a downloading of the downloaded depth information based on a location of a mobile device.

The method can further include triggering a downloading of the downloaded depth information based on a threshold distance of a mobile device from a location associated with downloaded depth information on the mobile device. The method can further include filtering the downloaded depth information based on a distance of a datapoint in the downloaded depth information from a location of a mobile device. The device depth map can be generated at least one of using hardware sensors of a mobile device and using software executing on the mobile device. The device depth map can be generated using data that is captured at substantially the same time as a corresponding image is being captured by a mobile device, and the image can be being rendered on a display of the mobile device directly following the capture of the image. The downloaded depth information can be captured by a different device than a device generating the device depth map, the downloaded depth information can include data that was captured earlier in time as compared to a time the device depth map is generated, the downloaded depth information can include data that can be converted to depth data by the device generating the device depth map, and the downloaded depth information can include distance values in a range that is outside a range of depth values associated with the device depth map. The hybrid depth map can include distance values in a first range limited in distance by capabilities associated with a device generating the device depth map, and the hybrid depth map can include distance values in at least one second range outside the first range.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. For example, the relative thicknesses and positioning of layers, regions, and/or structural elements may be reduced or exaggerated for clarity. The use of similar or identical reference numbers in the various drawings is intended to indicate the presence of a similar or identical element or feature.

DETAILED DESCRIPTION

Depth images, depth maps, and/or the like (herein after depth maps) can be generated either from hardware sensors (e.g., within a mobile device) or through software (e.g., executing on a mobile device). A problem with this system is that current hardware sensors tend to be limited in range to about 5 to 10 meters from the mobile device including the hardware sensors. In addition, software depth sensing can get sparse depth results up to a few dozen meters away from the mobile device executing the software. However, some applications, such as walking navigation, require depth information several dozen or hundreds of meters away from the mobile device executing the application.

A solution to this problem can be to use depth information external (e.g., generated by some other device and stored on a server) to the mobile device. Using the external depth information alone may not be completely sufficient to solve the problem. Therefore, the external depth information can be used together with the depth maps generated (locally) by the mobile device.

Example implementations can use depth information, external to the mobile device. The depth information can be, for example, three-dimensional (3D) geometric data of the world representing the terrain, roads and buildings in the real world. By overlapping the remote depth information on the user's view on the mobile device, a depth map can be generated that can extend beyond the hardware and/or software capabilities of the mobile device.

Figure 1:
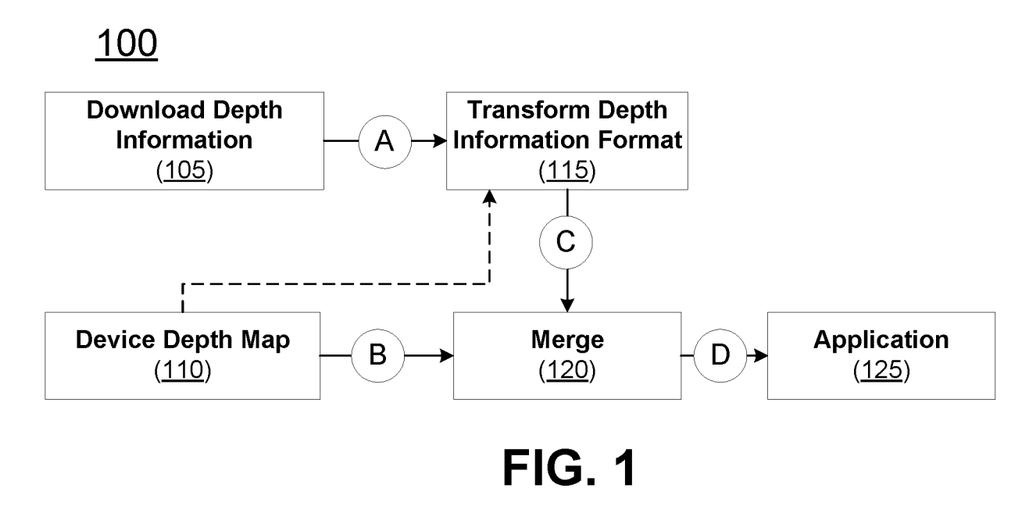
FIG. 1 illustrates a system for generating a hybrid depth map according to an example embodiment.

FIG. 1 illustrates a system for generating a hybrid depth map according to an example embodiment. As shown in FIG. 1, the system 100 includes a download depth information 105 block, a device depth map 110 block, a transform depth information format 115 block, a merge 120 block, and an application 125. The system 100 can be implemented as code segments stored in a memory (e.g., a non-transitory memory) that are executed by a processor.

The download depth information 105 block can be configured to download depth information from a network storage device (e.g., a server). The downloaded depth information can be associated with a location of a mobile device executing the application 125. The depth information can be two-dimensional (2D) or 3D geometric data of the world representing the terrain, roads and buildings in the real world, a depth map, an image including depth information, and/or the like. The depth information can be stored in a queue. The depth information can be downloaded based on a predicted (e.g., future) location of the mobile device.

The device depth map 110 block can be configured to acquire (e.g., receive, cause the capture of, and/or the like) depth data of the mobile device. For example, the depth data of the mobile device can be generated using hardware sensors (e.g., within the mobile device) or using software (e.g., executing on the mobile device).

The downloaded depth information can be of a first format A and the depth data of the mobile device can be of a second format B. For example, downloaded depth information may be optimized for 2D top-view (vertical) rendering, 3D top-view (vertical) rendering, 2D side-view (horizontal) rendering, 3D side-view (horizontal) rendering, and/ or the like. In other words, the downloaded depth information may be composed or formatted mainly by coordinates (latitude/longitude). In addition, the location associated with the downloaded depth information data may be misaligned (e.g., off by a couple meters) as compared to the depth data of the mobile device. Therefore, the downloaded depth information may be reformatted to align or match with the depth data of the mobile device. The transform depth information format 115 block can be configured to align the downloaded depth information format A to align with the depth data of the mobile device format B. In other words, the transform depth information format 115 block can be configured to convert the coordinates (e.g., latitude/ longitude) of the downloaded depth information to the coordinates (e.g., cartesian, horizontal, vertical, and depth) used on the mobile device (e.g., by application 125). The transform depth information format 115 block can be configured to shift the converted downloaded depth information to align with the location of the mobile device. The format C of the shifted, converted downloaded depth information can be aligned with the format B of the depth data of the mobile device.

The data associated with the shifted, converted downloaded depth information alone may not be accurate enough for applications requiring precise depth information. For example, the application 125 can be a first-person view application such as augmented reality (AR) application that requires precise depth information. Therefore, shifted, converted downloaded depth information may be merged with the depth data of the mobile device. Accordingly, the merge 120 block can be configured to merge the shifted, converted downloaded depth information with the depth data of the mobile device. This merged depth data D can be referred to as hybrid depth data or a hybrid depth map that is input to the application 125 as the precise depth information used by the application 125. Downloading depth information is discussed in more detail with regard to FIG. 2, transforming the downloaded depth information is described in more detail with regard to FIG. 3, and merging depth data is described in more detail with regard to FIG. 4.

Figure 2:
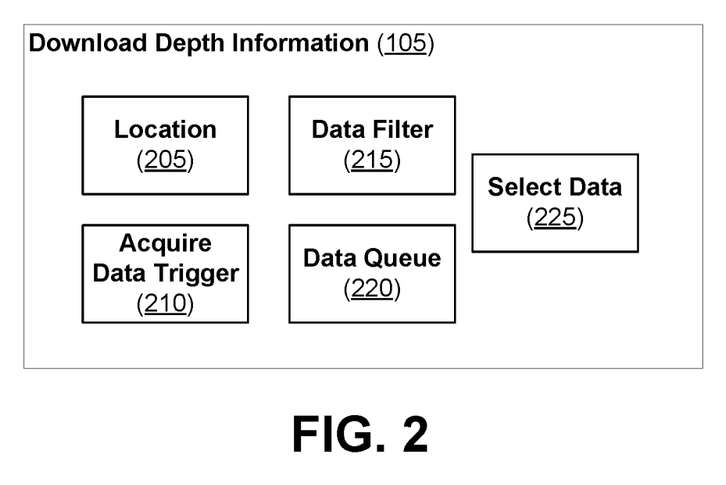
FIG. 2 illustrates a system for downloading a depth map according to an example embodiment.

FIG. 2 illustrates a system for downloading depth information according to an example embodiment. As shown in FIG. 2, the download depth information 105 block can include a location 205 block, an acquire data trigger 210 block, a data filter 215 block, a data queue 220 block, and a select data 225 block. The download depth information 105 block can be implemented as code segments stored in a memory (e.g., a non-transitory memory) that are executed by a processor.

The location 205 block can be configured to determine the location of the mobile device executing the application 125. In an example implementation, the mobile device can be operating in an open air, or outdoor environment and/or an indoor environment. Therefore, the location can be acquired from a global positioning system (GPS) of the mobile device, a location tracking (e.g., triangulation) application (e.g., based on provider hardware location), and/or the like. The location can be continually updated. The location can be based on an anchor point (e.g., a hardware position, a starting position, and/or the like). The location can be relative to some other location (e.g., cell tower, a building, another mobile device, and/or the like).

The acquire data trigger 210 block be configured to trigger the downloading of data representing the depth information from a network device (e.g., a server). Triggering the downloading of the data can be based on the location 205. For example, data representing the depth information can be stored in the data queue 220 in relation to a location 205 (e.g., coordinates). Triggering the downloading of the map data can be initiated based on a threshold distance (e.g., 1 m, 2 m, 5 m, and/or the like) from the location 205 of depth information stored in the data queue 220. In other words, should the mobile device be moving such that there is no depth information in the data queue 220 within the threshold distance of the (current) location 205 of the mobile device, the acquire data trigger 210 can cause the downloading of new data representing depth information. In an example implementation, the downloaded depth information can be limited to a threshold range (e.g., a radius) from/around the mobile device. Further, the ranges associated with two or more depth information locations can overlap.

The data filter 215 block can be configured to reduce the number of datapoints (e.g., pixels, geometric shapes, mesh vertices and/or the like) associated with the downloaded and/or queued depth information. The data filter 215 can be based on a distance from the mobile device. For example, the depth information can be filtered such that there is more data (e.g., pixels, geometric shapes, mesh vertices and/or the like) close to the mobile device location as compared to data far away from the mobile device. The data filter 215 can be applied to depth information before the data associated with the depth information is stored in the data queue 220. The data filter 215 can be applied to depth information after the data representing the depth information is retrieved from the data queue 220. The data filter 215 can have ranges. For example, data between 0 and 5 meters may be unfiltered, 10% of data between 5 and 10 meters is removed, 20% of data between 10 and 15 meters is removed, 30% of data between 15 and 20 meters is removed, and so forth.

The select data 225 block can select depth information from the data queue 220 in response to a request for map data from the application 125. The select data 225 block can select depth information based on the location 205. For example, data representing the depth information can be stored in the data queue 220 in association with a geographic location. Therefore, the location 205 can be used to look-up depth information in the data queue 220. A successful look-up can return depth information that has an associated location that is within a threshold distance of the location 205. In an example implementation, if a look-up is unsuccessful (e.g., no map data is returned), the acquire data trigger 210 can cause a downloading of the requested depth information from the network device (e.g., server).

Figure 3:
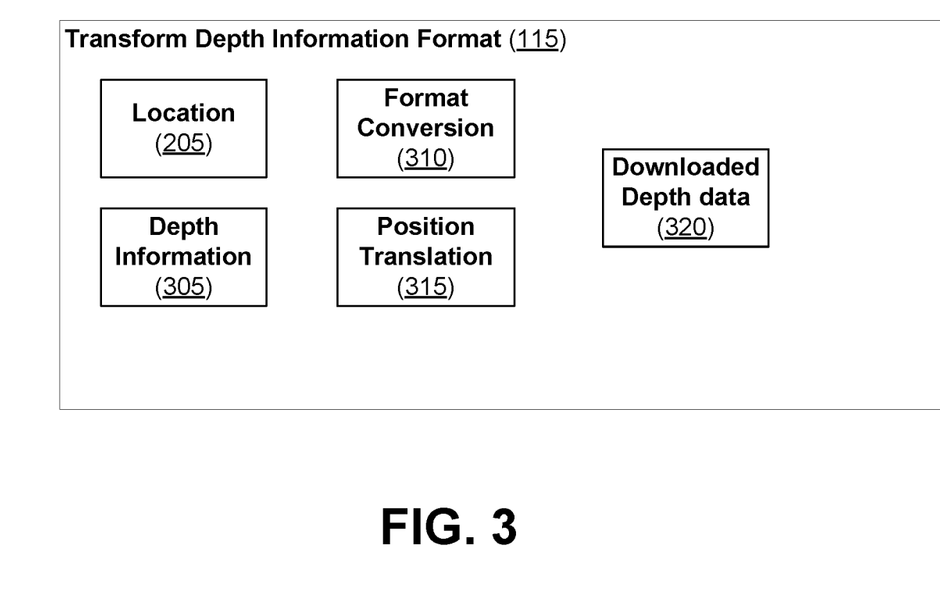
FIG. 3 illustrates a system for transforming a depth map format according to an example embodiment.

FIG. 3 illustrates a system for transforming a depth information format (or data format) according to an example embodiment. As shown in FIG. 3, the transform depth information format 115 block can include the location 205 block, a depth information 305 block, a format conversion 310 block, a position translation 315 block, and a downloaded depth data 320 block. The transform depth information format 115 block can be implemented as code segments stored in a memory (e.g., a non-transitory memory) that are executed by a processor.

The depth information 305 block can be the depth information (e.g., data) to be transformed into depth information that is formatted the same as a depth map generated by the mobile device. The depth information 305 can be (or can be equivalent to) the select data 225. The format conversion 310 block can be configured to convert depth information having, for example, data positioned in latitude/longitude coordinates with depth being based on relative height (e.g., if a camera is located above (vertical) the location) or based on relative distance (e.g., if a camera is located on the ground (e.g., horizontal)) to depth information data having, for example, data positioned as horizontal/vertical coordinates with depth being based on a relative distance from a reference position. In an example implementation, the horizontal/vertical (e.g., cartesian, x, y) coordinates and the depth (e.g., z) can be based on a direction (e.g., based on the latitude/longitude coordinate of the data point in relation to the latitude/longitude coordinate of the position of the mobile device) and the depth (e.g., height) of the data point.

The position translation 315 block can be configured to modify the reformatted depth information data based on a position of the user device and/or a position of components within the user device. For example, the reformatted depth information data may consider location 205 without considering the distance of the mobile device from the ground (e.g., height). The position translation 315 can be configured to modify the reformatted depth information data (e.g., x, y, and/or depth) based on the distance of the mobile device from the ground. Further, the GPS system may not be as precise as necessary for the application 125. However, the position translation 315 may correct for this lack of precision by modifying the reformatted depth information data (e.g., x, y, and/or depth) based on, for example, a predetermined factor (e.g., a distance and/or direction) determined during a calibration of the mobile device. Lastly, the position of the GPS within the mobile device may be different than the position of the mobile device depth hardware sensors (and/or the equivalent depth position for software calculated depth). Therefore, the position translation 315 may correct for this lack of precision caused by this difference by modifying the reformatted depth information data (e.g., x, y, and/or depth) based on, for example, a predetermined positioning factor determined at or prior to manufacture of the mobile device. The downloaded depth data 320 block can include the reformatted and translated depth information data as depth information (e.g., 2D or 3D geometric data, a depth map, an image including depth information, and/or the like) that is usable by the application 125.

Figure 4A:
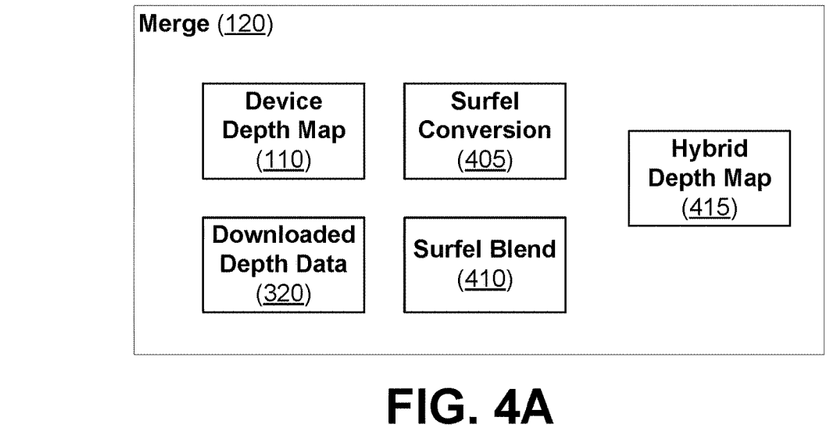
FIG. 4A illustrates a system for merging depth maps according to an example embodiment.

FIG. 4 illustrates a system for merging depth maps according to an example embodiment. As shown in FIG. 4, the merge 120 block can include the device depth map 110 block, the downloaded depth data 320 block, a surfel conversion 405 block, a surfel blend 410 block, and a hybrid depth map 415 block. The merge 120 block can be implemented as code segments stored in a memory (e.g., a non-transitory memory) that are executed by a processor.

The surfel conversion 405 block can be configured to convert depth information to surfel data. The device depth map 110 block and the downloaded depth data 320 block can each include depth data that can be elements of a depth map (e.g., geometric data, an image including both pixel data and depth data associated with the pixels) or a data structure representing a depth map. The data structure can include color information, texture information, depth information, position information, and direction information. The depth information can include depth layers each having a number (e.g., an index or z-index) indicating a layer order. The depth information can be a layered depth image (LDI) having multiple ordered depths for each pixel in an image. The depth information can include depth maps. Accordingly, the device depth map 110 block can correspond to a depth image (or data structure) captured by the mobile device and the downloaded depth data 320 block can correspond to a depth image (or data structure) downloaded from a network device (e.g., server).

The surfel conversion 405 block can be configured to convert the depth map captured by the mobile device and/or the depth information downloaded from a network device to surfel data. For example, a pixel when projected into a representation of a surface can be considered a surface element (surfel). Surfels can be used to efficiently render complex geometric objects in a 3D space in real-time (at interactive frame rates). Surfels can include one or more samples (points) that are included in a raw LDI. A surfel can be a point primitive that lacks any specific connectivity. As such, surfels can be used to model dynamic geometry because topology information, such as adjacency information, does not need to be computed. Attributes of a surfel can include, but are not limited to, depth, texture color, radius, and a normalized orientation vector and position.

Each scene image can be assembled into a data structure (e.g., an LDI) that can be used in a representation of a simplified version of the scene for rendering (drawing) in real time in 3D in, for example, an AR space by an AR application. For example, the plurality of pixel samples or points can be grouped into multiple partitions. A partition can be a plane or a polygon that includes a subset of the plurality of pixel samples or points that represent the scene image. A partition plane (e.g., partition plane 304) can be at a location in the 3D image space where the subset of points are located within the 3D space. In some implementations, a quadrangulation algorithm can create polygon approximations that can be used to create a partition plane. In some implementations, an iterative partitioning algorithm can create the polygon approximations that can be used to create a partition plane.

In an example implementation, the hybrid depth map can include distance values in a first range limited in distance by capabilities associated with a device generating the device depth map, and the hybrid depth map can include distance values in at least one second range outside the first range. In other words, the hybrid depth map can include distance values that range to or approximately range to the maximum depth of the mobile device (e.g., of the depth sensors in the mobile device). These depth values can be based on the device depth map. The hybrid depth map can also include distance values that range past the maximum depth of the mobile device. These depth values can be based on the downloaded depth information.

Figure 4B:
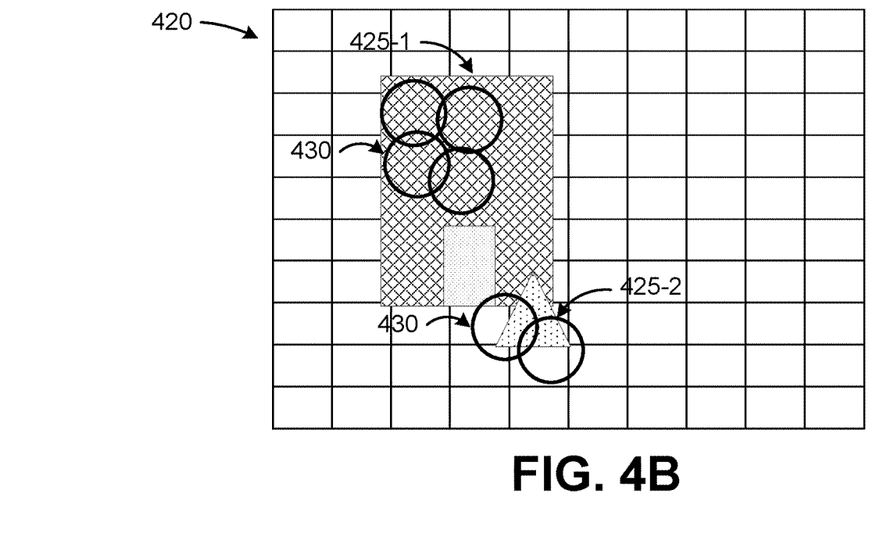
FIG. 4B pictorially illustrate a geometry according to an example implementation.

FIG. 4B pictorially illustrates a geometry according to an example implementation. The geometry can be stored as a data structure (as discussed above). For example, the data structure can be an n-tuple, a surfel, and/or the like). In an example implementation, surfels can be generated from input depth by first estimating the normal orientation associated with each pixel in the input. Once there is a depth value and normal vector associated with each pixel, surfels can be generated by clustering these pixels and generating disks (as discussed above) represented in world coordinates. The size of these disks can be based on a number of neighboring pixels that share the same depth and orientation (and possibly color). These surfels can be stored across frames of the AR session, and as each new depth frame is integrated, the surfels can be updated and/or merged based on this new information. If new depth information disagrees with the previous surfel data (e.g., something moves in the scene), the original surfels can be penalized (e.g., decreased confidence), deleted, and/or replaced with new geometry.

As shown in FIG. 4B, a grid 420 can represent a portion of a real-world geometry (or partition plane) as can be displayed on a display of the mobile device (e.g., as an AR display). On the grid 420 is a first object 425-1 (e.g., a building) in the real world and a second object 425-2 (e.g., a tree). In the illustration, the second object 425-2 can be closer to the user device than the first object 425-1. Circles 430 are a pictorial representation of a data structure (e.g., a surfel footprint) that can include information about a portion of the grid 420 including the first object 425-1 and the second object 425-2. In an example implementation, the data structure (or data structures, surfel(s), and/or the like) can be stored as stored geometry. For example, the surfel conversion 405 can generate and store a geometry representing the device depth map 110 and/or the downloaded depth data 320.

The surfel blend 410 block can be configured to blend the geometry representing the device depth map 110 with the geometry representing the downloaded depth data 320. Blending the geometry representing the device depth map 110 with the geometry representing the downloaded depth data 320 can generate a representation of the real-world or a real-world image. Blending two or more images can include combining portions of each image. For example, data (e.g., depth data, color data, pixels, and/or the like) that is missing from the geometry representing the device depth map 110 can be filled in using data from the geometry representing the downloaded depth data 320. For example, pixels having the same position and/or same position and same depth can be combined. The position can be based on a distance and direction from the point of reference (or home position). The position can be based on a coordinate system (e.g., cartesian grid, x, y grid or grid 420).

For example, a portion of the pixels in an image including a depth map can be blank or marked as invalid. Therefore, in an example implementation, a pixel (e.g., having depth) that is missing or marked as invalid (e.g., missing depth information or invalid depth information) in the geometry (or rendering) representing the device depth map 110 can be filled in with a pixel (e.g., the depth information) from the geometry representing the downloaded depth data 320 having the same position and layer as the missing or invalid pixel or vice-versa. In an example implementation, a pixel from the geometry representing the device depth map 110 and the geometry representing the downloaded depth data 320 have the same position and are at a layer having the same index value. Blending can include selecting the pixel from the geometry representing the device depth map 110 and discarding the pixel from the geometry representing the downloaded depth data 320 (or vice-versa).

Alternatively, blending can include selecting the pixel from the geometry representing the downloaded depth data 320 and discarding the pixel from the geometry representing the device depth map 110. Alternatively, blending the two images can include averaging the color and assigning the averaged color to the position and the layer. Other techniques for blending two images are within the scope of this disclosure.

In an example implementation, the downloaded data can be merged into the device data. The motivation for this is that the downloaded data can be static (e.g., the data won't change over the course of the AR session). However, the device data has the opportunity to change as the user continues to scan the environment. Accordingly, merging the downloaded data into the device data could result in more accurate measurements over time. By merging the downloaded data into the device data, this technique can provide an initial estimate for each area, but then the device can improve upon the initial downloaded data if the user happens to scan an area that was originally covered by the downloaded data. When this happens, the original downloaded data can get updated and improved with the new device data.

Further, prior to blending, images can be projected into each other. For example, images can be captured while the mobile device is moving. A previous frame (e.g., as stored in a buffer) can be reprojected into a current frame. This implementation can enable (or help enable) aligning objects and/or observed features across frames. The hybrid depth map 415 block can be or can include the resultant blending of the geometry representing the device depth map 110 with the geometry representing the downloaded depth data 320.

Figure 5:
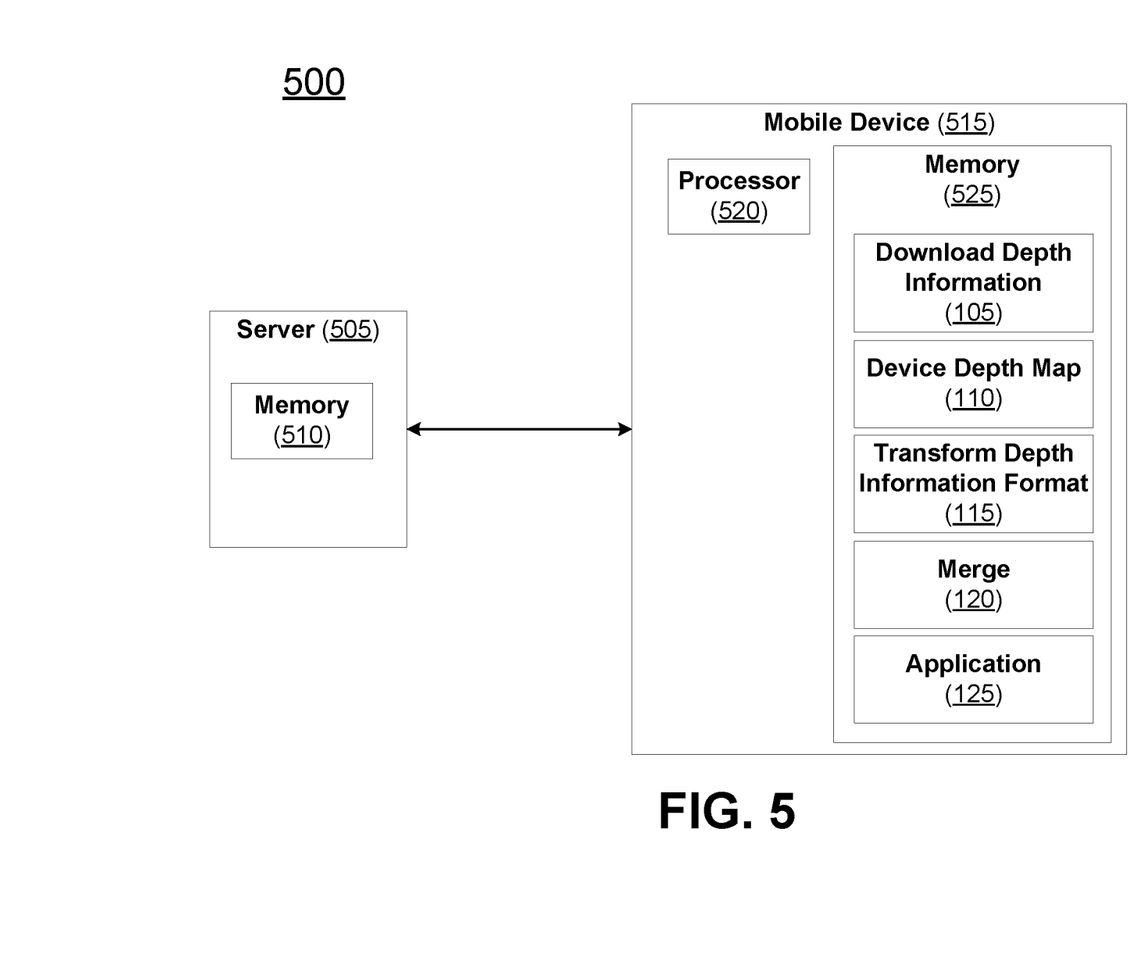
FIG. 5 illustrates an apparatus for generating a hybrid depth map according to an example embodiment.

FIG. 5 illustrates a system for generating a hybrid depth map according to an example embodiment. As shown in FIG. 5, a system 500 includes a server 505 communicatively coupled with a mobile device 515 (or user device). The server 505 includes a memory 510. The memory 510 can be configured to store a data structure, a geometry, an image, a data map, and/or the like each including depth data and/or depth information associated with a real-world location. The server 505 can be configured to communicate the geometry, the image, the data map, and/or the like in response to a request from the mobile device 515.

The mobile device 515 can include a processor 520 and a memory 525. The memory can include the download depth information 105 block, the device depth map 110 block, the transform depth information format 115 block, the merge 120 block, and the application 125 as described above. The processor 520 can be configured to execute code to implement the functionality of the download depth information 105 block, the device depth map 110 block, the transform depth information format 115 block, the merge 120 block, and/or the application 125.

Figure 6:
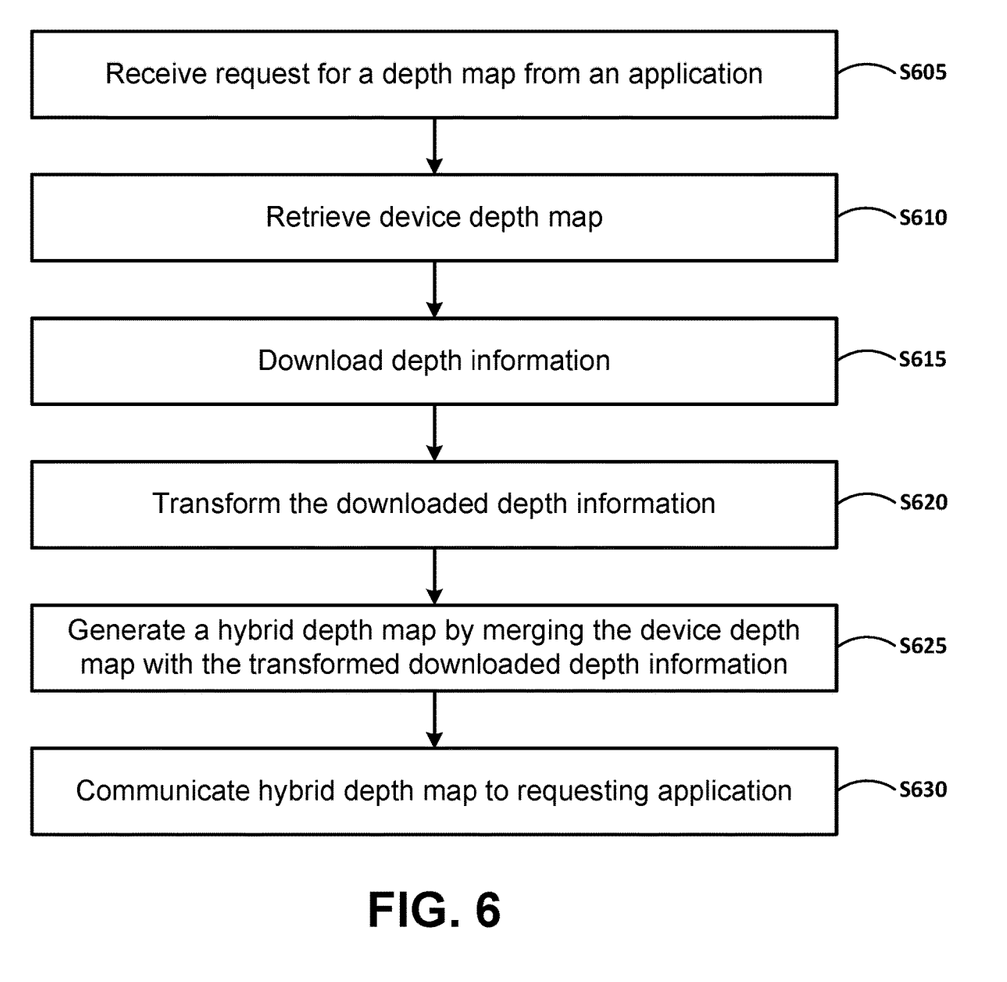
FIG. 6 illustrates a method for generating a hybrid depth map according to an example embodiment.

FIG. 6 illustrates a method for generating a hybrid depth map according to an example embodiment. As shown in FIG. 6, in step S605 a request for a depth map is received from an application. An application (e.g., application 125) may need a depth map to perform an operation. For example, the application can be executing on an AR device (e.g., mobile device 515). The application can be causing the rendering of an image including depth information on a display of the AR device. In an example implementation, the depth information can include a hybrid depth map.

In step S610 a device depth map is retrieved. A device depth map can be a depth map generated by a device (e.g., mobile device 515) using sensors of the device and/or software configured to generate depth information that is executing on the device. For example, the device can be an AR device executing an AR application that has requested a depth map (and/or a depth image, depth data, depth information, and/or the like). The AR device can be operating in an open air and/or outdoor environment. The AR application can cause the AR device to trigger the generation of the depth map as the device depth map (e.g., using the sensors and/or software).

In step S615 depth information is downloaded. The AR device can be operating in an open air and/or outdoor environment, therefore, image data (e.g., map data), depth data, depth information, and/or the like may be available based on the location of the AR device. For example, imagery captured by a vehicle can be used as map data that can include depth information and/or imagery captured by an orbiting satellite can be used as map data that can include depth information. The map data including depth information (e.g., as metadata) can be stored at a network device (e.g., server 505) communicatively coupled with the AR device (e.g., as mobile device 515). Accordingly, the AR device (e.g., software executing on the AR device) can request a depth information (and/or a depth image, depth data, depth map, and/or the like) from the network device. In response to the request, the depth information can be downloaded from the network device.

In step S620 the downloaded depth information is transformed. For example, the downloaded depth information (data or depth map data) may be composed or formatted mainly by coordinates (latitude/longitude). In addition, the location associated with the downloaded depth information may be misaligned (e.g., off by a couple meters) as compared to the device depth map (as generated by the AR or mobile device). Therefore, data associated with the downloaded depth information may be reformatted to align with the device depth map data. In other words, the downloaded depth information data format can be aligned with the device depth map data format. For example, the coordinates (e.g., latitude/longitude) of the downloaded depth information can be converted to the coordinates (e.g., cartesian, horizontal, vertical, and depth) used on the AR or mobile device (e.g., by application 125). The converted downloaded depth information can also be shifted (or translated) to align with the location of the AR or mobile device.

In step S625 a hybrid depth map is generated by merging the device depth map with transformed downloaded depth information. For example, the device depth map and the transformed downloaded depth information can be rendered as surfel geometry representing the device depth map and the downloaded depth information. The geometry representing the device depth map can then be blended with the geometry representing the downloaded depth information. Blending the geometry representing the device depth map with the geometry representing the downloaded depth information can generate a representation of the real-world or a real-world image (representing a view of the location of the AR or mobile device). Blending two or more geometries (similar to images) can include combining portions of each geometry. For example, data (e.g., depth data, color data, pixels, and/or the like) that is missing from the geometry representing the device depth map can be filled in using data from the geometry representing the downloaded depth information (or vice-versa). For example, pixels having the same position and/or same position and same depth can be combined. The position can be based on a distance and direction from the point of reference (or home position). The position can be based on a coordinate system (e.g., x, y grid). The blended geometries can be or include the hybrid depth map.

In step S630 the hybrid depth map is communicated to the requesting application. For example, the hybrid depth map can be communicated to the AR application (e.g., application 125) for use in rendering an image on the display of the AR or mobile device.

Figure 7:
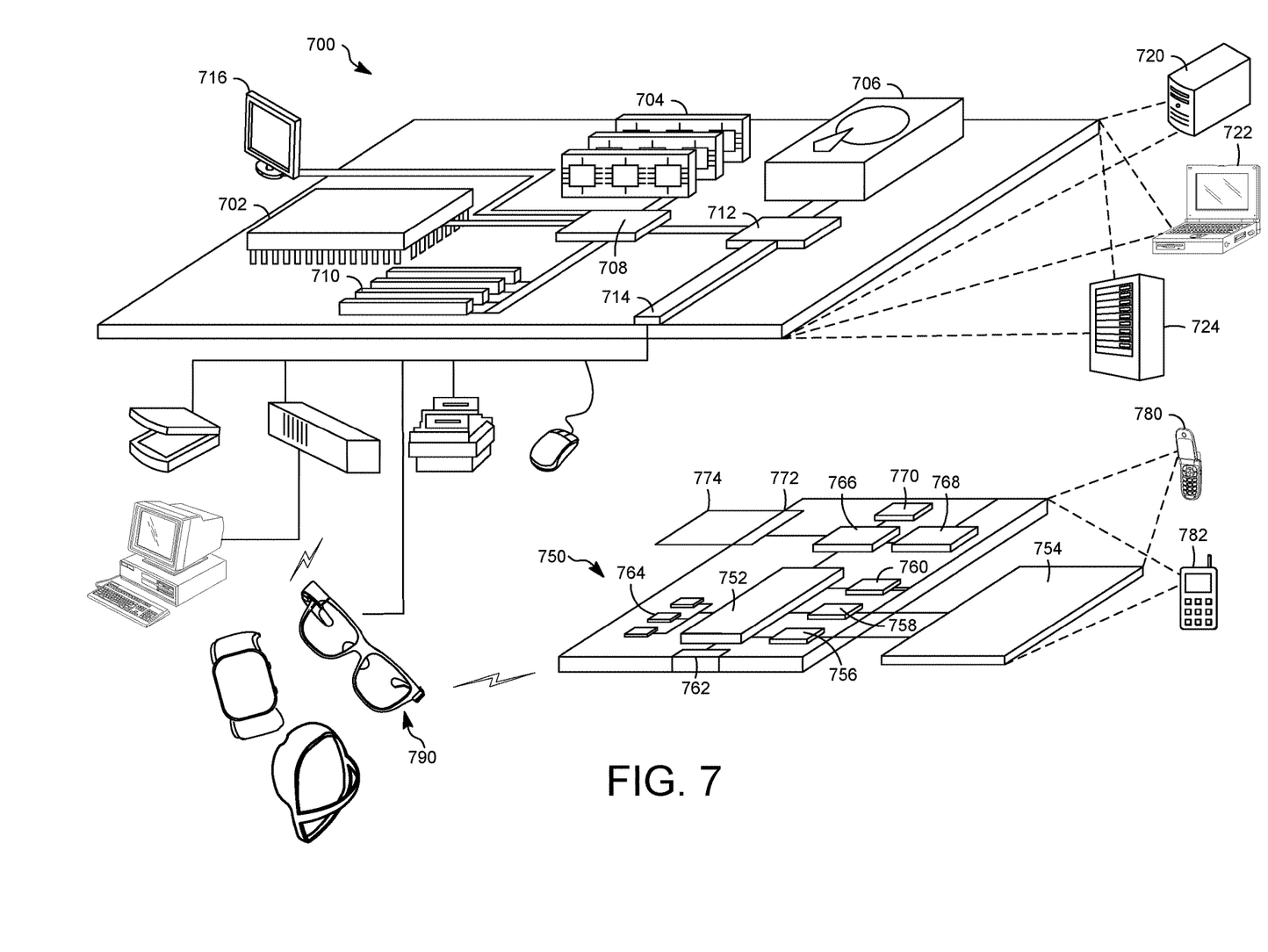
FIG. 7 shows an example of a computer device and a mobile computer device according to at least one example embodiment.

FIG. 7 illustrates an example of a computer device 700 and a mobile computer device 750, which may be used with the techniques described herein (e.g., to implement the client computing device (e.g., mobile device 515), the server computing device (e.g., server 505), as well as system 100 as implemented on the mobile device 515). The computing device 700 includes a processor 702, memory 704, a storage device 706, a high-speed interface 708 connecting to memory 704 and high-speed expansion ports 710, and a low-speed interface 712 connecting to low-speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low-speed controller 712 manages lower bandwidth-intensive operations. Such allocation of functions is example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display), and LED (Light Emitting Diode) or an OLED (Organic Light Emitting Diode) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In-Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 790 to generate an augmented environment for viewing inserted content within the physical space. For example, one or more sensors included on a computing device 750 or other computing device depicted in the figure, can provide input to the AR headset 790 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 750 can use the sensors to determine an absolute position and/or a detected rotation of the computing device in the AR space that can then be used as input to the AR space. For example, the computing device 750 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 750 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 750 when the computing device is incorporated into the AR space can cause a particular action to occur in the AR space.

In some implementations, a touchscreen of the computing device 750 can be rendered as a touchpad in AR space. A user can interact with the touchscreen of the computing device 750. The interactions are rendered, in AR headset 790 for example, as movements on the rendered touchpad in the AR space. The rendered movements can control virtual objects in the AR space.

In some implementations, one or more output devices included on the computing device 750 can provide output and/or feedback to a user of the AR headset 790 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 750 may appear as another object in a computer-generated, 3D environment. Interactions by the user with the computing device 750 (e.g., rotating, shaking, touching a touchscreen, swiping a finger across a touch screen) can be interpreted as interactions with the object in the AR space. In the example of the laser pointer in an AR space, the computing device 750 appears as a virtual laser pointer in the computer-generated, 3D environment. As the user manipulates the computing device 750, the user in the AR space sees movement of the laser pointer. The user receives feedback from interactions with the computing device 750 in the AR environment on the computing device 750 or on the AR headset 790. The user's interactions with the computing device may be translated to interactions with a user interface generated in the AR environment for a controllable device.

In some implementations, a computing device 750 may include a touchscreen. For example, a user can interact with the touchscreen to interact with a user interface for a controllable device. For example, the touchscreen may include user interface elements such as sliders that can control properties of the controllable device.

Computing device 700 is intended to represent various forms of digital computers and devices, including, but not limited to laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
    triggering a download of depth information based on a location of a mobile device;
    receiving a request for a depth map;
    generating a hybrid depth map based on a device depth map and the depth information; and
    responding to the request for the depth map with the hybrid depth map.

2. The method of claim 1, wherein generating the hybrid depth map includes
    retrieving the depth information from a network device, and
    transforming a format of the depth information to match a format of the device depth map.

3. The method of claim 1, wherein generating the hybrid depth map includes
    rendering the device depth map as geometric data,
    rendering the depth information as geometric data, and
    blending the device depth map geometric data with the depth information geometric data.

4. The method of claim 3, wherein the geometric data is a surface element (surfel).

5. The method of claim 1, wherein
    the depth information is in a latitude/longitude coordinate system format,
    the device depth map is in a cartesian coordinate system format, and
    generating the hybrid depth map includes transforming the depth information format to the cartesian coordinate system format.

6. The method of claim 1, wherein the triggering of the downloading of the depth information is based on a threshold distance of the mobile device from a location associated with the depth information on the mobile device.

7. The method of claim 1, further comprising filtering the depth information based on a distance of a datapoint in the depth information from a location of a mobile device.

8. The method of claim 1, wherein the device depth map is generated at least one of using hardware sensors of a mobile device and using software executing on the mobile device.

9. The method of claim 1, wherein
    the device depth map is generated using data that is captured at substantially the same time as a corresponding image is being captured by a mobile device, and
    the image is being rendered on a display of the mobile device directly following the capture of the image.

10. The method of claim 1, wherein
    the depth information is captured by a different device than a device generating the device depth map,
    the depth information includes data that was captured earlier in time as compared to a time the device depth map is generated,
    the depth information includes data that can be converted to depth data by the device generating the device depth map, and
    the depth information includes distance values in a range that is outside a range of depth values associated with the device depth map.

11. The method of claim 1, wherein
the hybrid depth map includes distance values in a first range limited in distance by capabilities associated with a device generating the device depth map, and
the hybrid depth map includes distance values in at least one second range outside the first range.

12. A non-transitory computer-readable storage medium comprising instructions stored thereon that, when executed by at least one processor, are configured to cause a computing system to:
trigger a download of depth information based on a location of a mobile device;
receive a request for a depth map;
generate a hybrid depth map based on a device depth map and the depth information; and
respond to the request for the depth map with the hybrid depth map.

13. The non-transitory computer-readable storage medium of claim 12, wherein generating the hybrid depth map includes
retrieving the depth information from a network device, and
transforming a format of the depth information to match a format of the device depth map.

14. The non-transitory computer-readable storage medium of claim 12, further comprising filtering the depth information based on a distance of a datapoint in the depth information from a location of a mobile device.

15. The non-transitory computer-readable storage medium of claim 12, wherein
the device depth map is generated using data that is captured at substantially the same time as a corresponding image is being captured by a mobile device, and
the image is being rendered on a display of the mobile device directly following the capture of the image.

16. The non-transitory computer-readable storage medium of claim 12, wherein
the hybrid depth map includes distance values in a first range limited in distance by capabilities associated with a device generating the device depth map, and
the hybrid depth map includes distance values in at least one second range outside the first range.

17. The non-transitory computer-readable storage medium of claim 12, wherein generating the hybrid depth map includes
rendering the device depth map as geometric data,
rendering the depth information as geometric data, and
blending the device depth map geometric data with the depth information geometric data.

18. The non-transitory computer-readable storage medium of claim 17, wherein the geometric data is a surface element (surfel).

19. An apparatus comprising:
at least one processor; and
at least one memory including computer program code;
the at least one memory and the computer program code configured to, with the at least one processor, cause the apparatus to:
trigger a download of depth information based on a location of a mobile device;
receive a request for a depth map;
generate a hybrid depth map based on a device depth map and the depth information; and
respond to the request for the depth map with the hybrid depth map.

20. The apparatus of claim 19, wherein generating the hybrid depth map includes
rendering the device depth map as geometric data,
rendering the depth information as geometric data, and
blending the device depth map geometric data with the depth information geometric data.

21. The apparatus of claim 19, wherein
the depth information is in a latitude/longitude coordinate system format,
the device depth map is in a cartesian coordinate system format, and
generating the hybrid depth map includes transforming the depth information format to the cartesian coordinate system format.

22. The apparatus of claim 19, wherein the triggering of the downloading of the depth information is based on a threshold distance of the mobile device from a location associated with the depth information on the mobile device.

23. The apparatus of claim 19, wherein the device depth map is generated at least one of using hardware sensors of a mobile device and using software executing on the mobile device.

24. The apparatus of claim 19, wherein
the depth information is captured by a different device than a device generating the device depth map,
the depth information includes data that was captured earlier in time as compared to a time the device depth map is generated,
the depth information includes data that can be converted to depth data by the device generating the device depth map, and
the depth information includes distance values in a range that is outside a range of depth values associated with the device depth map.

* * * * *